(12) United States Patent
Wu et al.

(10) Patent No.: US 12,237,922 B2
(45) Date of Patent: Feb. 25, 2025

(54) DATA RETRANSMISSION METHOD AND COMMUNICATION APPARATUS

(71) Applicant: HUAWEI TECHNOLOGIES CO., LTD., Guangdong (CN)

(72) Inventors: Weimin Wu, Wuhan (CN); Zheng Xiao, Wuhan (CN); Jian Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 369 days.

(21) Appl. No.: 17/692,306

(22) Filed: Mar. 11, 2022

(65) Prior Publication Data

US 2022/0200732 A1  Jun. 23, 2022

Related U.S. Application Data

(63) Continuation of application No. PCT/CN2020/114876, filed on Sep. 11, 2020.

(30) Foreign Application Priority Data

Sep. 12, 2019 (CN) .......................... 201910863502.X

(51) Int. Cl.
*H04L 1/08* (2006.01)
*H04L 1/00* (2006.01)

(52) U.S. Cl.
CPC .............. *H04L 1/08* (2013.01); *H04L 1/0009* (2013.01)

(58) Field of Classification Search
CPC ....... H04L 1/1819; H04L 1/0075; H04L 1/08; H04L 1/1845

See application file for complete search history.

(56) References Cited

U.S. PATENT DOCUMENTS 10,742,472 B1 * 8/2020 Van Nee ................. H04L 27/36
2017/0230149 A1 * 8/2017 Wang .................... H04L 1/1819
(Continued)

FOREIGN PATENT DOCUMENTS

CN    103516495 A    1/2014
CN    106301710 A    1/2017
(Continued)

OTHER PUBLICATIONS

IEEE Std 802.Nov. 2016 (Revision of IEEE Std 802.Nov. 2012), "Part 11: Wireless LAN Medium Access Control (MAC) and Physical Layer (PHY) Specifications," IEEE Computer Society, Dec. 2016, 3534 pages.
(Continued)

*Primary Examiner* — Yee F Lam
(74) *Attorney, Agent, or Firm* — Fish & Richardson P.C.

(57) ABSTRACT

This application provides example data retransmission methods and communication apparatuses. One example method includes receiving a physical protocol data unit (PPDU) by a first device and from a second device, where the PPDU includes a signaling field and a data field, the data field includes retransmitted data and newly transmitted data, the signaling field includes first indication information, or the signaling field comprises the first indication information and second indication information, the first indication information indicates a first modulation and coding scheme (MCS) and a first coding mode that are used for the newly transmitted data, and the second indication information indicates a second MCS and a second coding mode that are used for the retransmitted data. The PPDU is demodulated based on the signaling field.

11 Claims, 9 Drawing Sheets

(56) References Cited

U.S. PATENT DOCUMENTS

| | | | |
|---|---|---|---|
| 2019/0116513 A1 | 4/2019 | Verma et al. | |
| 2020/0008267 A1* | 1/2020 | Noh | H04L 1/0008 |
| 2020/0076552 A1* | 3/2020 | Cherian | H04B 7/024 |
| 2020/0112878 A1* | 4/2020 | Liu | H04L 1/1896 |
| 2020/0213933 A1* | 7/2020 | Patil | H04W 80/02 |
| 2020/0228380 A1* | 7/2020 | Yang | H04L 5/0039 |
| 2020/0329444 A1* | 10/2020 | Cao | H04W 72/044 |
| 2020/0344007 A1* | 10/2020 | Chen | H04L 1/1819 |
| 2020/0374062 A1* | 11/2020 | Verma | H04B 7/024 |
| 2020/0382998 A1* | 12/2020 | Cao | H04L 1/0041 |
| 2020/0389259 A1* | 12/2020 | Zhang | H04L 1/1896 |
| 2021/0050952 A1* | 2/2021 | Noh | H04L 1/189 |

FOREIGN PATENT DOCUMENTS

| | | |
|---|---|---|
| CN | 109218243 A | 1/2019 |
| CN | 109586889 A | 4/2019 |
| CN | 109600205 A | 4/2019 |
| WO | 2016045092 A1 | 3/2016 |
| WO | 2017041540 A1 | 3/2017 |
| WO | 2018205226 A1 | 11/2018 |
| WO | 2019152240 A1 | 8/2019 |

OTHER PUBLICATIONS

PCT International Search Report and Written Opinion issued in International Application No. PCT/CN2020/114876 on Dec. 16, 2020, 17 pages (with English translation).

Office Action in Chinese Appln. No. 201910863502.X, dated May 25, 2023, 7 pages.

* cited by examiner

DATA RETRANSMISSION METHOD AND COMMUNICATION APPARATUS

CROSS-REFERENCE TO RELATED APPLICATIONS

This application is a continuation of International Application No. PCT/CN2020/114876, filed on Sep. 11, 2020, which claims priority to Chinese Patent Application No. 201910863502.X, filed on Sep. 12, 2019. The disclosures of the aforementioned applications are hereby incorporated by reference in their entireties.

TECHNICAL FIELD

This application relates to the field of wireless communication technologies, and more specifically, to a data retransmission method and a communication apparatus.

BACKGROUND

In a communication system, signal transmission may fail due to a time-varying characteristic and multipath fading of a wireless channel. Generally, a forward error correction (forward error correction, FEC) coding technology and an automatic repeat-request (automatic repeat-request, ARQ) method are used to perform error control. For example, in a wireless local area network (Wireless Local Area Network, WLAN), when an access point (access point, AP) transmits data to a station (station, STA), if the STA successfully receives the data, the STA feeds back an acknowledgment (acknowledge, ACK) frame to the AP. If the STA fails to receive data, the STA does not feed back any frame. If the AP does not receive any feedback, the AP retransmits the sent data to perform error control.

Based on the ARQ method, a hybrid automatic repeat request (Hybrid ARQ, HARQ) is further introduced into standards such as long term evolution (Long Term Evolution, LTE). A receive end stores the data received for the first time. When receiving retransmitted data, the receive end combines the data received for the first time and the data received during retransmission, thereby increasing a decoding success rate. Because a HARQ can further increase a success rate of receiving retransmitted data, a HARQ mechanism is usually used in a deep fading area or an edge area in a wireless network. The mechanism can usually enable a transmit end to use a higher modulation and coding scheme (modulation and coding scheme, MCS) to improve transmission efficiency.

In a data transmission process in which the HARQ mechanism is used, for a receive device, data transmitted during one transmission may be all newly transmitted data or all retransmitted data, or may include both retransmitted data and newly transmitted data. In an existing mechanism, for the foregoing cases, almost all the newly transmitted data and all the retransmitted data use a unified MCS and a coding mode, resulting in low data transmission reliability.

SUMMARY

This application provides a data retransmission method and a communication apparatus, to improve reliability of data transmission in a HARQ mechanism.

According to a first aspect, this application provides a data retransmission method. The method includes: A receive apparatus receives a physical protocol data unit PPDU from a transmit apparatus, where the PPDU includes a signaling field and a data field, the data field includes retransmitted data and newly transmitted data, the signaling field includes first indication information, or the signaling field includes the first indication information and second indication information, where the first indication information is used to indicate a first modulation and coding scheme MCS and a first coding mode that are used for the newly transmitted data, and the second indication information is used to indicate a second MCS and a second coding mode that are used for the retransmitted data; and demodulates the PPDU based on the signaling field.

According to the technical solutions of this application, for different reliability requirements of the retransmitted data and the newly transmitted data, the transmit apparatus uses respective different MCSs and coding modes for the newly transmitted data and the retransmitted data, so that reliability of data transmission can be improved.

For example, after an error occurs in one transmission, a more reliable coding mode may be used for the newly transmitted data, to prevent a second error. This can improve reliability of retransmission.

In addition, in a retransmission process, the transmit apparatus selects a resource unit with better quality for the newly transmitted data, so that a higher MCS may be used for the newly transmitted data, and a data transmission rate can be improved.

With reference to the first aspect, in some implementations of the first aspect, the signaling field includes the first indication information, and the demodulating the PPDU based on the signaling field includes: demodulating the newly transmitted data included in the data field based on the first indication information by using the first MCS and the first coding mode, and demodulating the retransmitted data included in the data field by using a third MCS and a third coding mode that are used when the retransmitted data is demodulated last time.

The transmit apparatus does not indicate, in the signaling field of the PPDU, an MCS and a coding mode that are used for the retransmitted data. The receive apparatus uses, by default, the third MCS and the third coding mode that are used for demodulating the retransmitted data last time. This can reduce overheads of the signaling field of the PPDU.

With reference to the first aspect, in some implementations of the first aspect, the signaling field includes the first indication information and the second indication information, and the demodulating the PPDU based on the signaling field includes: demodulating the newly transmitted data included in the data field based on the first indication information and the second indication information by using the first MCS and the first coding mode; and demodulating the retransmitted data included in the data field by using the second MCS and the second coding mode.

The signaling field of the PPDU indicates the MCS and the coding mode used for the retransmitted data and the MCS and the coding mode used for the newly transmitted data. In a retransmission process, newly transmitted data and retransmitted data may not use a unified MCS and coding mode, and a more flexible MCS and a coding mode may be supported in the HARQ mechanism.

According to a second aspect, this application provides a data retransmission method. The method includes: A transmit apparatus generates a PPDU, where the PPDU includes a signaling field and a data field, the data field includes retransmitted data and newly transmitted data, the signaling field includes first indication information, or the signaling field includes the first indication information and second indication information, where the first indication information is used to indicate a first modulation and coding scheme MCS and a first coding mode that are used for the newly transmitted data, and the second indication information is used to indicate a second MCS and a second coding mode that are used for the retransmitted data; and transmits the PPDU to a receive apparatus.

It should be understood that the data retransmission method in the second aspect and the data retransmission method in the first aspect are based on a same inventive idea. Therefore, for beneficial technical effects that can be achieved by the technical solutions in the second aspect, refer to descriptions of the corresponding solutions in the first aspect. Details are not described again.

With reference to the second aspect, in some implementations of the second aspect, the signaling field includes the first indication information, the newly transmitted data included in the data field is encoded by using the first MCS and the first coding mode, and the retransmitted data included in the data field is encoded by using the second MCS and the second coding mode.

With reference to the second aspect, in some implementations of the second aspect, the signaling field includes the first indication information and the second indication information, the newly transmitted data included in the data field is encoded by using the first MCS and the first coding mode, and the retransmitted data included in the data field is encoded by using the second MCS and the second coding mode.

In some implementations of the first aspect or the second aspect, that the signaling field includes the first indication information and the second indication information includes: The signaling field includes an EHT-SIG-B, and the EHT-SIG-B includes a first signaling field and a second signaling field, where the first signaling field includes the first indication information, and the second signaling field includes the second indication information.

In some implementations of the first aspect or the second aspect, that the signaling field includes the first indication information and the second indication information includes: The signaling field includes an EHT-SIG-B and an EHT-SIG-C, where the EHT-SIG-B includes the first indication information, and the EHT-SIG-C includes the second indication information.

In some implementations of the first aspect or the second aspect, that the signaling field includes the first indication information and the second indication information includes: The signaling field includes an EHT-SIG-C, where the EHT-SIG-C includes the first indication information and the second indication information; and the signaling field further includes an EHT-SIG-B, where the EHT-SIG-B includes an MCS field, and a reserved value of the MCS field is used to indicate that the data field includes the retransmitted data.

Herein, to distinguish from the first indication information and the second indication information, information used to indicate whether the data field includes the retransmitted data is referred to as third indication information.

In other words, in this embodiment, the MCS field carries third indication information, and the third indication information is specifically used to indicate that the data field includes the retransmitted data.

The reserved value of the MCS field is used to indicate whether the data field includes the retransmitted data, so that a field is not specially set for the third indication information. This can reduce overheads of the signaling field of the PPDU. In addition, structural design complexity of the PPDU can be reduced.

In some implementations of the first aspect or the second aspect, the MCS field further has a plurality of non-reserved values, and each non-reserved value is used to indicate the first MCS and the first coding mode that are used for the newly transmitted data.

The plurality of non-reserved values of the MCS field of the PPDU indicate respective different MCSs and coding modes that are used for the newly transmitted data in the data field, and implicitly indicate that there is no retransmitted data in the data field. This is equivalent to introducing a bitmap indication of an RV. When there are only some RV versions in the data field, overheads of the signaling field are reduced.

In some implementations of the first aspect or the second aspect, the data field includes M OFDM symbols in time domain, and a quantity of symbols occupied by the newly transmitted data in the data field is calculated according to the following formula: $M-\text{ceil}(L/K)$, where L is a total quantity of bits of the retransmitted data, K is a quantity of bits that can be used to carry data on each of the M OFDM symbols, ceil( ) indicates rounding up, and M, L, and K are all positive integers.

According to a third aspect, this application provides a communication apparatus. The communication apparatus has a function of implementing the method according to the first aspect and any one of the possible implementations of the first aspect. The function may be implemented by hardware, or may be implemented by hardware executing corresponding software. The hardware or the software includes one or more units corresponding to the foregoing functions.

According to a fourth aspect, this application provides a communication apparatus. The communication apparatus has a function of implementing the method according to the second aspect and any one of the possible implementations of the second aspect. The function may be implemented by hardware, or may be implemented by hardware executing corresponding software. The hardware or the software includes one or more units corresponding to the foregoing functions.

According to a fifth aspect, this application provides a communication device, including a processor, a memory, and a transceiver. The memory is configured to store a computer program. The processor is configured to: invoke and run the computer program stored in the memory, and control the transceiver to transmit and receive a signal, so that the communication device performs the method according to the first aspect or any one of the possible implementations of the first aspect.

According to a sixth aspect, this application provides a communication device, including a processor, a memory, and a transceiver. The memory is configured to store a computer program. The processor is configured to: invoke and run the computer program stored in the memory, and control the transceiver to transmit and receive a signal, so that the communication device performs the method according to the second aspect or any one of the possible implementations of the second aspect.

According to a seventh aspect, this application provides a computer-readable storage medium. The computer-readable storage medium stores computer instructions. When the computer instructions are run on a computer, the computer is enabled to perform the method according to the first aspect or any one of the possible implementations of the first aspect.

According to an eighth aspect, this application provides a computer-readable storage medium. The computer-readable storage medium stores computer instructions. When the computer instructions are run on a computer, the computer is enabled to perform the method according to the second aspect or any one of the possible implementations of the second aspect.

According to a ninth aspect, this application provides a computer program product. The computer program product includes computer program code. When the computer program code is run on a computer, the computer is enabled to perform the method according to the first aspect or any one of the possible implementations of the first aspect.

According to a tenth aspect, this application provides a computer program product. The computer program product includes computer program code. When the computer program code is run on a computer, the computer is enabled to perform the method according to the second aspect or any one of the possible implementations of the second aspect.

According to an eleventh aspect, this application provides a communication apparatus, including a processor. The processor is configured to read and execute a computer program stored in a memory, to perform the method according to the first aspect or any one of the possible implementations of the first aspect.

For example, the communication apparatus may be a chip or a chip system.

Optionally, the chip further includes a memory, and the memory and the processor are connected to the memory through a circuit or a cable. The memory may store a computer program or instructions necessary for implementing the method according to the first aspect.

Further, optionally, the chip further includes a communication interface.

According to a twelfth aspect, this application provides a communication apparatus. The communication apparatus includes a processor. The processor is configured to read and execute a computer program stored in a memory, to perform the method according to the second aspect or any one of the possible implementations of the second aspect.

For example, the communication apparatus may be a chip or a chip system.

Optionally, the chip further includes a memory, and the memory and the processor are connected to the memory through a circuit or a cable. The memory may store a computer program or instructions necessary for implementing the method according to the second aspect.

Further, optionally, the chip further includes a communication interface.

The chip system in the foregoing aspects may be a system on chip (system on chip, SOC), a baseband chip, or the like. The baseband chip may include a processor, a channel encoder, a digital signal processor, a modem, an interface module, and the like.

According to a thirteenth aspect, this application provides a communication system. The communication system includes the communication device according to the fifth aspect and/or the communication device according to the sixth aspect.

DESCRIPTION OF EMBODIMENTS

The following describes technical solutions of this application with reference to accompanying drawings.

The technical solutions of this application are applicable to a scenario in which one communication device performs data transmission with one communication device, or one communication device performs data transmission with a plurality of communication devices. For example, the solutions of this application are applicable to uplink transmission or downlink transmission in a single-user equipment scenario or a multi-user equipment scenario, and are also applicable to data transmission in a device to device (device to device, D2D) scenario. This is not limited in this application.

Figure 1:
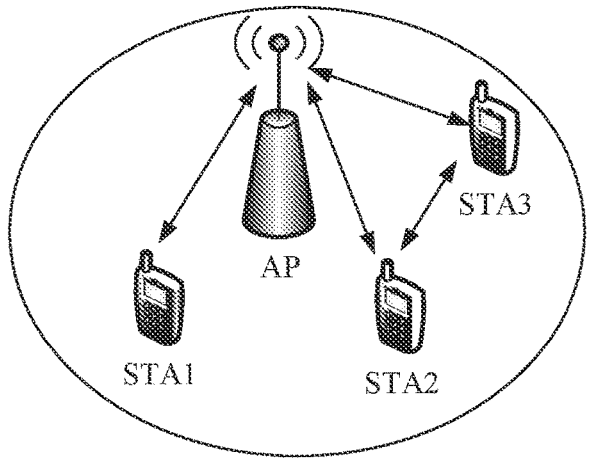
FIG. 1 is a schematic diagram of a system architecture applicable to embodiments of this application.

FIG. 1 is a schematic diagram of a system architecture applicable to embodiments of this application. As shown in FIG. 1, a wireless communication system may include at least one access point (access point, AP) and one or more stations (station, STA), such as a STA1, a STA2, and a STA3 shown in FIG. 1.

The AP may communicate with one or more STAs. When the AP transmits a signal, the AP is a transmit device, and the STA that receives the signal is a receive device. On the contrary, when the STA transmits a signal, the STA is a transmit device, and the AP is a receive device.

In addition, D2D communication may be performed between the STAs in the wireless communication system, for example, the STA2 and the STA3 shown in FIG. 1. A STA that transmits data is a transmit device, and a STA that receives data is a receive device.

The foregoing scenario is merely used as an example for description, and is not limited to the foregoing scenario. Actually, the technical solutions of this application may be used for data transmission between any two communication devices.

In addition, the technical solutions in the embodiments of this application may be applied to a plurality of communication systems, for example, a wireless local area network (wireless local area network, WLAN), a long term evolution (long term evolution, LTE) system, an LTE frequency division duplex (frequency division duplex, FDD) system, an LIE time division duplex (time division duplex, TDD) system, a universal mobile telecommunication system (universal mobile telecommunication system, UMTS), a worldwide interoperability for microwave access (worldwide interoperability for microwave access, WiMAX) communication system, a future 5th generation (5th generation, 5G) system, a new radio (new radio, NR), Internet of Vehicles, Internet of Things, and the like.

The communication device in the embodiments of this application may be a network device or a terminal device. For example, both a transmit device and a receive device are terminal devices. Alternatively, one of the transmit device and the receive device is a network device, and the other is a terminal device, or the like.

The terminal device in the embodiments of this application may also be referred to as user equipment, an access terminal, a subscriber unit, a subscriber station, a mobile station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, a terminal device in a future evolved public land mobile communication network (public land mobile network, PLMN), or the like. This is not limited in the embodiments of this application.

The network device in the embodiments of this application may be any device having a wireless transceiver function. The network device includes but is not limited to an evolved node B (evolved Node B, eNB), a radio network controller (radio network controller, RNC), a node B (Node B, NB), a base station controller (base station controller, BSC), a base transceiver station (base transceiver station, BTS), a home evolved node B (home evolved Node B, or home NodeB, HNB), a baseband unit (baseband unit, BBU), an access point (access point, AP) in a wireless fidelity (wireless fidelity, WI-FI) system, a wireless relay node, a wireless backhaul node, a transmission point (transmission point, TP) or a transmission and reception point (transmission and reception point, TRP), and the like. The network device may further include the fifth generation (the fifth generation, 5G) system, for example, a gNB or a transmission point (TRP or TP) in a new radio (new radio, NR), or one or a group of antenna panels (including a plurality of antenna panels) of a base station in the 5G system. The network device may further include a network node that constitutes a gNB or a transmission point, for example, a building baseband unit (building baseband unit, BBU) or a distributed unit (distributed unit, DU), and the like.

In some deployments, the gNB may include a centralized unit (centralized unit, CU) and a distributed unit (distributed unit, DU). The gNB may further include an active antenna unit (active antenna unit, AAU). The CU implements some functions of the gNB, and the DU implements some functions of the gNB. For example, the CU is responsible for processing a non-real-time protocol and a service, to implement functions of a radio resource control (radio resource control, RRC) layer and a packet data convergence protocol (packet data convergence protocol, PDCP) layer. The DU is responsible for processing a physical layer protocol and a real-time service, to implement functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU.

It may be understood that the network device may be a device including one or more of the CU, the DU, and the AAU. In addition, the CU may be a network device in an access network (radio access network, RAN), or may be a network device in a core network (core network, CN). This is not limited in this application.

The following describes in detail the technical solutions provided in this application.

Figure 2:
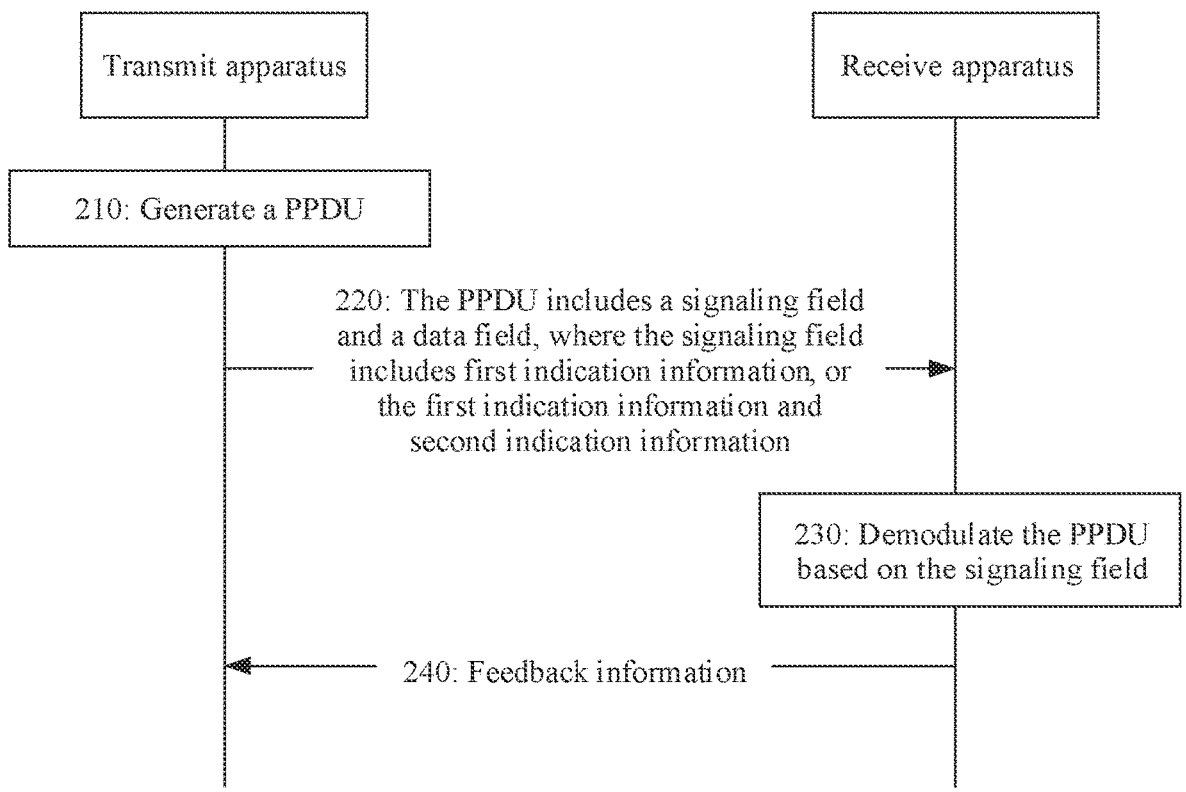
FIG. 2 is a flowchart of a data retransmission method according to this application.

FIG. 2 is a flowchart of a data retransmission method according to this application.

210: A transmit apparatus generates a PPDU.

The PPDU includes a signaling field and a data field. The data field includes retransmitted data and newly transmitted data, the signaling field includes first indication information, or the signaling field includes the first indication information and second indication information. The first indication information is used to indicate a first modulation and coding scheme MCS and a first coding mode that are used for the newly transmitted data, and the second indication information is used to indicate a second MCS and a second coding mode that are used for the retransmitted data.

Further, the signaling field may further include third indication information, and the third indication information is used to indicate whether the data field includes the retransmitted data.

It should be understood that the data field may alternatively include only the newly transmitted data, or the data field may include only the retransmitted data. These two cases are also applicable to the solutions in the embodiments of this application, and details are described in below.

220: The transmit apparatus transmits the PPDU to a receive apparatus.

Correspondingly, the receive apparatus receives the PPDU from the transmit apparatus.

230: The receive apparatus demodulates the PPDU based on the signaling field of the PDDU.

Specifically, the receive apparatus may learn whether the data field of the PPDU includes the retransmitted data based on the third indication information carried in the signaling field of the PPDU.

In a possible case, all data fields are newly transmitted data. In this case, the third indication information is used to indicate that the data field of the PPDU does not include the retransmitted data, and the signaling field includes the first indication information.

In this case, the receive apparatus demodulates data in the data field of the PPDU based on the first MCS and the first coding mode that are indicated by the first indication information.

In another possible case, the data field includes both the retransmitted data and the newly transmitted data. In this case, the third indication information is used to indicate that the data field of the PPDU includes the retransmitted data. The signaling field includes the first indication information and the second indication information, and the first indication information and the second indication information are respectively used to indicate MCSs and coding modes that are respectively used for the newly transmitted data and the retransmitted data.

In this case, the receive apparatus demodulates the newly transmitted data in the data field by using the first MCS and the first coding mode indicated by the first indication information, and demodulates the retransmitted data in the data field by using the second MCS and the second coding mode indicated by the second indication information.

Alternatively, in this case, the signaling field may not include the third indication information. To be specific, when the signaling field carries the first indication information and the second indication information, by default the data field includes both the newly transmitted data and the retransmitted data.

In still another possible case, the data field includes both the retransmitted data and the newly transmitted data. In this case, the third indication information is used to indicate that the data field of the PPDU includes the retransmitted data. In addition, the signaling field includes the first indication information.

In this case, the receive apparatus demodulates the newly transmitted data included in the data field by using the first MCS and the first coding mode that are indicated by the first indication information.

In addition, the receive apparatus demodulates the retransmitted data by using a third MCS and a third coding mode that are used when the retransmitted data is demodulated last time. In other words, in this case, the transmit apparatus does not indicate an MCS and a coding mode that are used for the retransmitted data, and the receive apparatus uses, by default, an MCS and a coding mode that are used when the retransmitted data is demodulated last time.

In another possible case, all data fields are retransmitted data. In this case, the third indication information is used to indicate that the data field of the PPDU includes the retransmitted data. The signaling field may include the second indication information, or may not include the second indication information.

For example, in a specific implementation, the signaling field includes the second indication information, and the second indication information is used to indicate an MCS and a coding mode that are used for the retransmitted data included in the data field.

For another example, in another specific implementation, the signaling field does not indicate an MCS and a coding mode that are used by the transmit apparatus to encode the retransmitted data. In this case, the receive apparatus demodulates the retransmitted data by using the MCS and the coding mode that are used when the retransmitted data is demodulated last time.

Optionally, the retransmitted data included in the data field is indicated by using a field in the signaling field, and the newly transmitted data included in the data field is indicated by using another field in the signaling field. This is not limited herein.

Optionally, after step 230, step 240 may be further included.

240: The receive apparatus transmits feedback information to the transmit apparatus based on a result of demodulating the PPDU.

The feedback information may be a positive acknowledgment or a negative acknowledgment, and depends on whether the receive apparatus correctly decodes all data of the data field.

According to the technical solutions of this application, for different reliability requirements of the retransmitted data and the newly transmitted data, the transmit apparatus uses respective different MCSs and/or coding modes for the newly transmitted data and the retransmitted data, so that communication quality can be improved.

It should be noted that, to improve transmission efficiency of a media access control (media access control, MAC) frame, a MAC frame is introduced since the 802.11n standard and is also referred to as an aggregation frame of a media access control protocol data unit (MAC protocol data unit, MPDU). The aggregated frame is also referred to as an aggregated media access control protocol data unit (aggregated MAC protocol data unit, A-MPDU). For a frame format of the aggregated frame, refer to FIG. 3.

Figure 3:
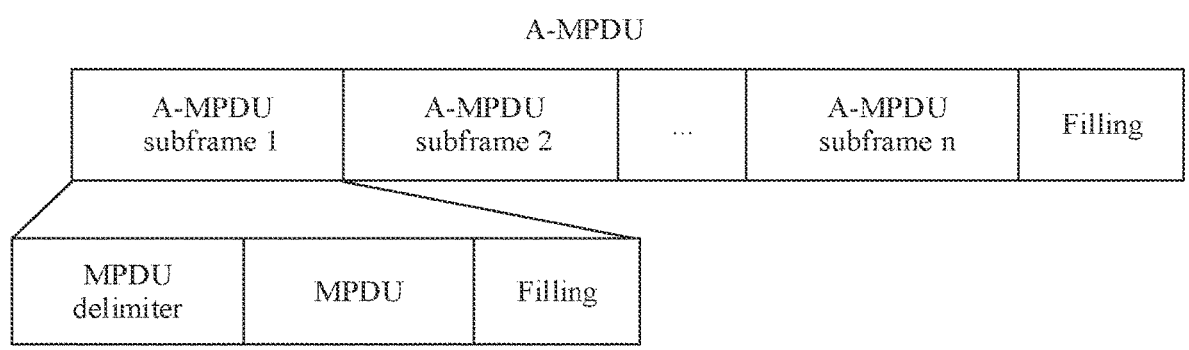
FIG. 3 is a schematic diagram of a frame format of an A-MPU.

FIG. 3 is a schematic diagram of a frame format of an A-MPU. As shown in FIG. 3, the A-MPDU aggregates a plurality of MPDUs, and uniformly transmits the MPDUs through a physical layer preamble, thereby effectively reducing overheads caused by contention for a channel and a physical layer preamble. The plurality of MPDUs are separated through a delimiter (delimiter), and connected together.

An A-MPDU that includes only one delimiter and one MPDU is referred to as a single media access control protocol data unit (single MPDU, S-MPDU). The 802.11 standard uses a simple acknowledgment frame to reply to an MPDU and an S-MPDU. Whether to transmit an acknowledgment frame indicates whether the MPDU or the S-MPDU is successfully received. If the MPDU or the S-MPDU is successfully received, the acknowledgment frame is acknowledgment (ACK). If the MPDU or the S-MPDU is not successfully received, the acknowledgment frame is negative acknowledgment (NACK). For the A-MPDU, a block acknowledgment frame is used for reply. The block acknowledgment frame includes a bitmap, which may be used to specifically indicate which MPDUs in the A-MPDU are correctly received and which MPDUs are not correctly received. If any MPDU in the aggregated frame is not correctly received, a STA may not teed back any information to an AP.

When the STA feeds back the NACK to the AP, the AP needs to perform HARQ retransmission on an A-MPDU that is not correctly received.

A HARQ may be broadly classified into two types: chase combining (chase combining, CC) and incremental redundancy (incremental redundancy, IR).

If a HARQ type is CC, in a retransmission process, a transmit apparatus retransmits same bits that are previously incorrectly transmitted. The receive apparatus combines the retransmitted data with received newly transmitted bits. The combining may be combining original information bits, or combining a log-likelihood ratio (log-likelihood ratio, LLR) before decoding with a currently received LLR, and then decoding a combined LLR value.

If the HARQ type is IR, in the retransmission process, the transmit apparatus retransmits additional check bit information, and retransmitted bits may have different redundant versions (redundant version, RV). The receive apparatus combines the original information with the additional received check bit information, and performs decoding again.

It may be understood that the "data" in this application may be an A-MPDU. For example, newly transmitted data may be a newly transmitted A-MPDU, and retransmitted data may be a retransmitted A-MPDU.

The following provides examples of several PPDUs in this application.

Manner 1

The transmit apparatus explicitly indicates the first MCS and the first coding mode that are used to encode the newly transmitted data, and implicitly indicates the second MCS and the second coding mode that are used to encode the retransmitted data.

The implicit indication herein indicates that the signaling field of the PPDU does not perform indication, and the receive apparatus uses, by default, the second MCS and the second coding mode that are used when the retransmitted data is transmitted last time.

Figure 4:
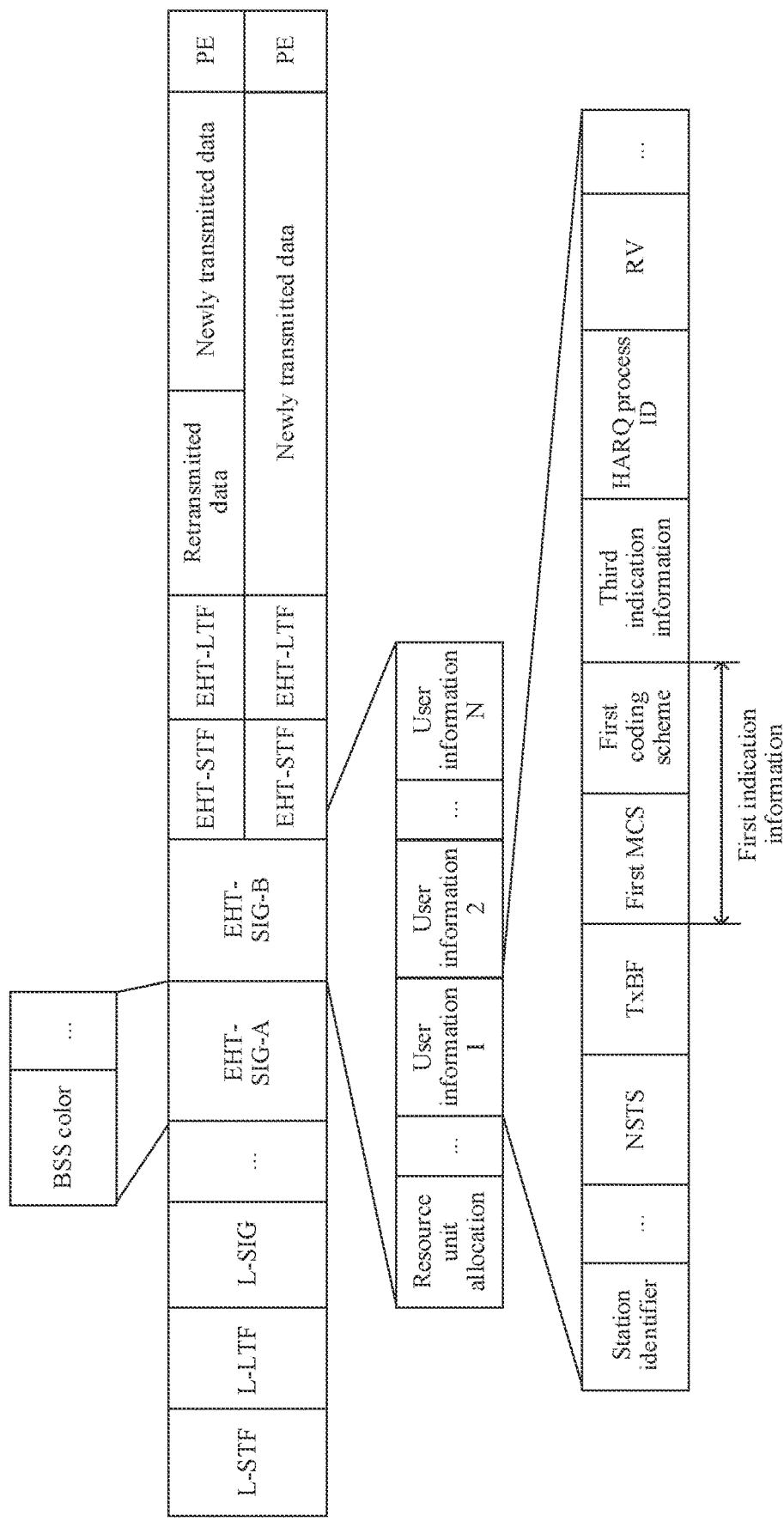
FIG. 4 is an example of a PPDU supporting a HARQ according to this application.

The following describes manner 1 with reference to FIG. 4.

FIG. 4 is an example of a PPDU according to this application. As shown in FIG. 4, the PPDU includes a preamble field and a data field. The preamble field includes two signaling fields: an extremely high throughput signal field A (extremely high throughput signal field-A, EHT-SIG-A) and an extremely high throughput signal field B (extremely high throughput signal field-B, EHT-SIG-B). The signal fields EHT-SIG-A and EHT-SIG-B are used to provide signaling required for demodulating the data field.

For brevity of description, the EHT-SIG-A and the EHT-SIG-B are respectively referred to as a field A and a field B below.

The field A includes a basic service set color (basic service set color, BSS color), and is used to distinguish different basic service sets.

The field B includes resource unit allocation information, and is used to indicate how resource units of the PPDU are divided.

In addition, the field. B may further include one or more user information fields, and each user information field carries information of one user. It should be understood that each user corresponds to one receive apparatus.

Each user information field carries parameters such as a station identifier, (for example, an association identifier (association identifier, AID)), a first MCS, a number of space-time streams (number of space-time streams, NSTS), a transmit beamforming (transmit beamforming, TxBF), and a first coding mode. The station identifier is also an identifier of the STA.

Optionally, the first coding mode may be a binary convolution code (Binary Convolution Code, BCC), a low density parity check (Low Density Parity Code, LDPC), or the like.

In addition, the field B further includes HARQ retransmission indication information, that is, the third indication information. The third indication information is used to indicate whether a resource unit allocated to the user includes the retransmitted data. For example, the third indication information may be set to 1 bit. When the 1 bit is 0, it indicates that the data field does not include the retransmitted data. When the 1 bit is 1, it indicates that the data field includes the retransmitted data.

Optionally, whether the data field includes the retransmitted data or the newly transmitted data may be separately indicated by using different indication information. For example, the HARQ retransmission indication information is set to two bits. One bit is used to indicate whether the data field includes the retransmitted data, and the other bit is used to indicate whether the data field includes the newly transmitted data.

It should be understood that one piece of user information shown in FIG. 4 may correspond to one receive apparatus. The user information 1, the user information 2 . . . , and the user information N shown in FIG. 4 respectively correspond to one receive apparatus. Each receive apparatus may determine user information that belongs to the receive apparatus based on the station identifier in the field B, and may obtain the first MCS, the first coding mode, and the third indication information in the user information.

Further, the field B may further include related information required for indicating a HARQ. For example, the field B may include the following information:

(1) A HARQ process ID (HARQ process ID, HARQ process ID), which identifies a specific HARQ process in the HARQ processes;

(2) A HARQ type (HARQ type), used to indicate a HARQ type, where the HARQ type may include chase combining (chase combining, CC) and incremental redundancy (incremental redundancy, IR);

(3) A transmitting address, used to identify the transmit apparatus;

(4) A receiving address, used to identify the receive apparatus; and (5) A redundancy version (redundancy version, RV), used to indicate a specific redundancy version in a plurality of redundancy versions of the retransmitted data, and used to identify different check information.

In addition, there may be a packet extension (packet extension, PE) field following the data field, to increase processing time of the receive apparatus.

In addition, the PPDU may further include another field, for example, a legacy long training field (long training field, LTF), a legacy short training field (short training field, STF), and a legacy signal (signal, SIG) field.

The "legacy" herein may refer to long term evolution (long term evolution, LTE). Therefore, the legacy long training field may be represented as an L-LTF, the legacy short training field may be represented as an L-STF, and the legacy signal field may be represented as an L-SIG.

For the transmit apparatus, if the third indication information is specifically used to indicate that a resource unit corresponding to a user includes a retransmitted A-MPDU subframe, the retransmitted A-MPDU subframe uses an MCS and a coding mode that are used in last transmission.

For retransmitted A-MPDU subframes, if a maximum quantity of HARQ retransmission times is not reached, the A-MPDU subframes are sorted according to a previous transmission sequence. The earlier an A-MPDU subframe is transmitted, the earlier the A-MPDU subframe is retransmitted. A-MPDU subframes previously transmitted together during one transmission are sorted in this retransmission according to the previous transmission sequence.

It should be understood that, for A-MPDU subframes whose maximum quantity of HARQ retransmission times is reached, if the A-MPDU subframes are transmitted again, the A-MPDU subframes are transmitted in a new transmission manner.

The transmit apparatus generates the data field of the PPDU according to the foregoing retransmission rule.

If the data field includes only a newly transmitted A-MPDU subframe, an MCS and a coding mode of the newly transmitted A-MPDU subframe are indicated in the signaling field of the PPDU.

If the data field includes both the newly transmitted A-MPDU subframe and a retransmitted A-MPDU subframe, the MCS and the coding mode of the newly transmitted A-MPDU subframe are indicated in the signaling field of the PPDU. In other words, the transmit apparatus does not indicate the MCS and the coding mode of the retransmitted A-MPDU subframe in the signaling field.

Further, if the data field includes both the retransmitted A-MPDU subframe and the newly transmitted A-MPDU subframe, there may be a plurality of implementations for sorting the retransmitted A-MPDU subframe and the newly transmitted A-MPDU subframe.

For example, in an implementation, the retransmitted A-MPDU subframe is located before the newly transmitted A-MPDU subframe. Both the transmit apparatus and the receive apparatus may determine a length of the retransmitted A-MPDU subframe based on a transmission status of a previous A-MPDU subframe, and the transmit apparatus does not need to additionally indicate the length of the retransmitted A-MPDU subframe to the receive apparatus.

The length of a retransmitted part varies according to different retransmission manners, which may include the following cases:

(1) Only a code block corresponding to an errored A-MPDU subframe that does not reach the maximum quantity of HARQ retransmission times is retransmitted.

During retransmission, a same code block may be repeatedly transmitted, that is, one of the foregoing HARQ types, which is specifically CC. Alternatively, the transmit apparatus may transmit different RVs, that is, another HARQ type, which is specifically IR.

Figure 5:
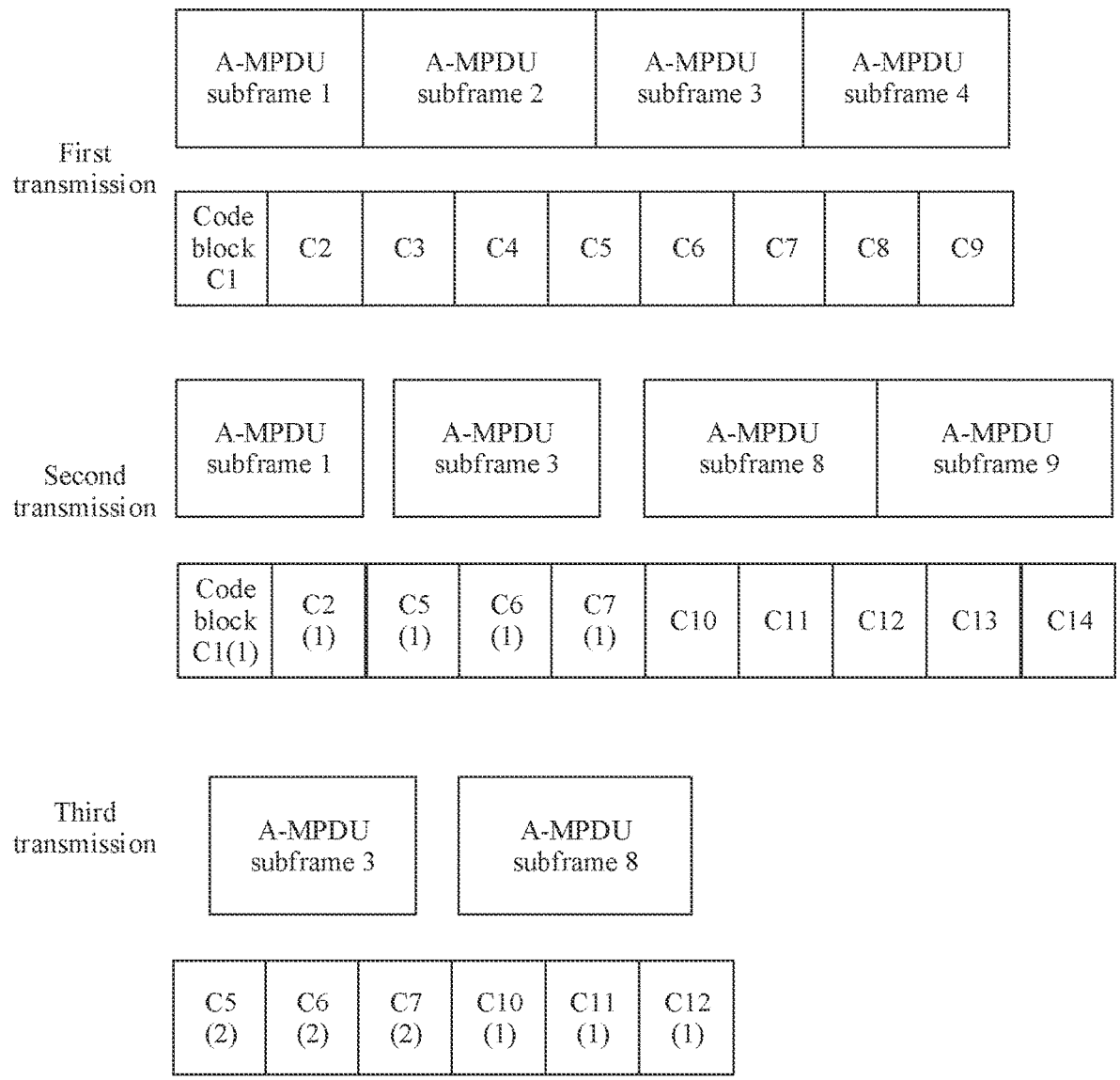
FIG. 5 is an example of a manner of retransmitting data by using a HARQ mechanism.

The following provides descriptions with reference to FIG. 5.

FIG. 5 is an example of a manner of retransmitting data by using a HARQ mechanism.

In a first transmission, the transmit apparatus transmits an A-MPDU subframe 1, an A-MPDU subframe 2, an A-MPDU subframe 3, and an A-MPDU subframe 4.

The receive apparatus transmits feedback information to the transmit apparatus based on a demodulation result of the A-MPDU subframes 1 to 4.

The transmit apparatus receives the feedback information from the receive apparatus, where the feedback information is used to indicate that the A-MPDU subframe 1 and the A-MPDU subframe 3 are incorrectly transmitted, and the A-MPDU subframe 2 and the A-MPDU subframe 4 are correctly transmitted.

In a second transmission, the transmit apparatus retransmits only code blocks corresponding to the A-MPDU subframe 1 and the A-MPDU subframe 3.

According to the foregoing retransmission rule, the retransmitted A-MPDU subframes are sorted according to a sequence of transmission last time. Therefore, in the second transmission, the A-MPDU subframe 1 is located before the A-MPDU subframe 3.

Optionally, the transmit apparatus may retransmit a code block that is the same as that in the first transmission, or may retransmit a code block of a redundancy version that is transmitted for the first time.

The following assumes that a total length of a retransmitted code block is L bits.

It should be understood that because the receive apparatus transmits the feedback information to the transmit apparatus, both the receive apparatus and the transmit apparatus know an A-MPDU subframe that needs to be retransmitted and a corresponding code block. Therefore, both the receive apparatus and the transmit apparatus may obtain the L bits.

In addition, in the second transmission, a newly transmitted A-MPDU subframe 8 and a newly transmitted A-MPDU subframe 9 may further be included after the retransmitted A-MPDU subframe.

The receive apparatus transmits feedback information to the transmit apparatus based on a demodulation result of the A-MPDU subframes transmitted for the second time.

The transmit apparatus receives the feedback information from the receive apparatus. The feedback information is used to indicate that the A-MPDU subframe 3 and the A-MPDU subframe 8 are incorrectly transmitted, and the remaining A-MPDU subframes are correctly transmitted.

In a third transmission, according to the foregoing retransmission rule, an A-MPDU subframe that is transmitted earlier is located before an A-MPDU that is transmitted later, and the A-MPDU subframe 3 is located before the A-MPDU subframe 8.

(2) During retransmission, regardless of receiving statuses of all A-MPDU subframes transmitted last time, if retransmission is required, all A-MPDU subframes transmitted last time are retransmitted.

The transmit apparatus and the receive apparatus may learn a value of L by using the transmission last time, It should be noted that, in FIG. 5, a number in parentheses following a code block indicates a number of times that the code block is retransmitted. For example, a code block C1(1) indicates a first retransmission of the code block C1. C5(1) indicates a first retransmission of a code block C5. For another example, C5(2) indicates a second retransmission of the code block C5.

It should be understood that a number that is in the parentheses following the code block and that is used to indicate the number of times that the code block is retransmitted is merely added for ease of understanding the technical solution. During actual transmission, a number of times that a retransmitted code block is retransmitted does not need to be identified for the retransmitted code block. Therefore, the receive apparatus may know based on a demodulation status of each A-MPDU subframe, and the transmit apparatus may also know based on a retransmission status of each A-MPDU subframe.

In addition, in the example shown in FIG. 5, it is only identified that a retransmitted A-MPDU subframe is located before a newly transmitted A-MPDU subframe. The following describes a more detailed demarcation between a retransmitted A-MPDU subframe and a newly transmitted A-MPDU subframe.

In an implementation, the retransmitted A-MPDU subframe and the newly transmitted A-MPDU subframe may be delimited by a bit.

Specifically, a next bit of a last bit of the retransmitted A-MPDU subframe is a first bit of the newly transmitted A-MPDU subframe.

Assuming that the data field includes M OFDM symbols in total, a quantity of data bits that can be carried in each symbol is K. According to the foregoing assumption, a total quantity of bits of a retransmitted code block is L. Therefore, it can be learned that the quantity of bits that can be used for new transmission is M·K−L. · indicates multiplication.

In another implementation, the newly transmitted A-MPDU subframe starts to be sent in a next symbol after transmission of the retransmitted A-MPDU subframe ends.

It should be understood that, if a last symbol in which the retransmitted A-MPDU subframe is located is not filled with retransmitted bits, bits need to be first filled in the last symbol. A quantity of bits that need to be filled is K−(L % K), where % represents a remainder. It can be learned that a quantity of symbols that may be used to transmit the newly transmitted A-MPDU subframe is M−ceil (L/K), where ceil represents rounding up.

The following is an example. Assuming that the data field includes a total of 70 OFDM symbols, and a total quantity of bits corresponding to the retransmission code block L=9720. A quantity K of bits that can be carried by each symbol is 234. In this case, the quantity of bits that need to be filled in the last symbol of the retransmitted A-MPDU subframe is 234−9720%234=108. Further, a quantity of symbols used to transmit the newly transmitted A-MPDU subframe is 70−ceil (9720/234)=28. Therefore, a quantity of symbols used to transmit the retransmitted A-MPDU subframe is 70−28=42.

After the transmit apparatus transmits the PPDU to the receive apparatus, the receive apparatus may learn duration of the PPDU according to a field L-SIG in the PPDU. Further, the receive apparatus obtains, based on the field A and/or the field B, the total quantity M of symbols of the data field of the PPDU and a resource unit to which the receive apparatus belongs.

The receive apparatus learns, based on the third indication information carried in the signaling field of the PPDU, whether the resource unit to which the receive apparatus belongs includes the retransmitted data.

If the resource unit includes the retransmitted data, the receive apparatus determines, based on a receiving status of data in the transmission last time, an A-MPDU subframe retransmitted in the current transmission and its corresponding code block, performs combination and demodulation, and Obtains a size of L.

Further, the receive apparatus may calculate a quantity of bits of the newly transmitted A-MPDU subframe. A calculation method is the same as that of the transmit apparatus. For details, refer to the foregoing description, and details are not described herein again.

Further, the receive apparatus obtains an MCS and a coding mode of the newly transmitted A-MPDU subframe based on the signaling field of the PPDU, to demodulate the newly transmitted A-MPDU subframe.

In the foregoing embodiment, a scenario in which there are a plurality of users and the PPDU corresponds to a plurality of resource units is used as an example (for example, FIG. 4). The scenario is also applicable to a scenario in which there is a single user and the PPDU corresponds to only one resource unit, for example, as shown in FIG. 6.

Figure 6:
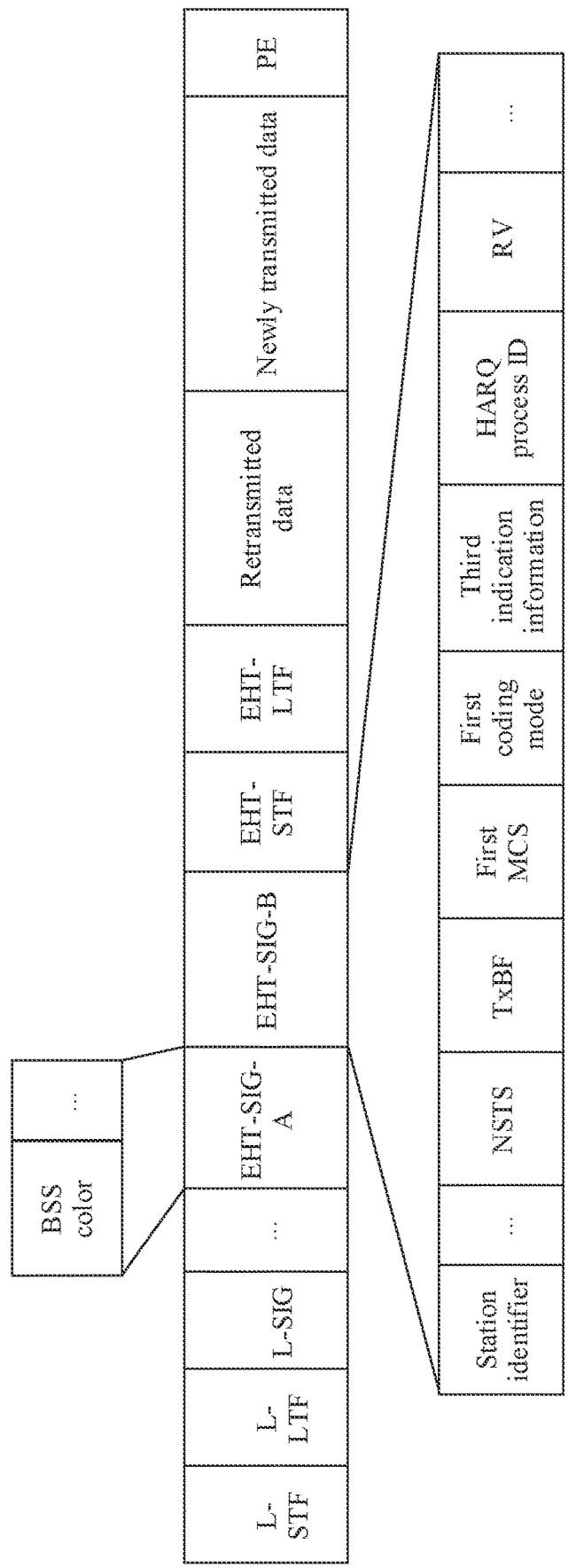
FIG. 6 is another example of a PPDU supporting a HARQ.

FIG. 6 is another example of a PPDU supporting a HARQ. The example in FIG. 6 is applicable to a single-user scenario and a PPDU corresponds to only one resource unit. In this scenario, after receiving the PPDU, the receive apparatus does not need to determine, based on the field B, user information corresponding to the receive apparatus and a resource unit to which the receive apparatus belongs. In other words, in the single-user scenario, the PPDU received by the receive apparatus is for the receive apparatus. Therefore, both the signaling field and the data field in the PPDU are for the receive apparatus. The receive apparatus directly demodulates the data field according to an indication of the signaling field in the PPDU.

Manner 2

The transmit apparatus explicitly indicates the first MCS and the first coding mode that are used to encode the newly transmitted data, and explicitly indicates the second MCS and the second coding mode that are used to encode the retransmitted data.

Specifically, the signaling field of the PPDU explicitly indicates MCSs and coding modes respectively used for the retransmitted A-MPDU subframe and the newly transmitted A-MPDU subframe.

In an implementation, in addition to the foregoing field A and field B, the PPDU may further include an extremely high throughput signal field C (extremely high throughput signal field-C, EHT-SIG-C). The field B and the field C respectively indicate the first MCS and the first coding mode, and the second MCS and the second coding mode.

For example, the field B indicates the first MCS and the first coding mode. The field C indicates the second MCS and the second coding mode. Alternatively, the field B indicates the second MCS and the second coding mode, and the field C indicates the first MCS and the first coding mode. This is not limited in this specification. Descriptions are provided by using examples below with reference to FIG. 7.

Figure 7:
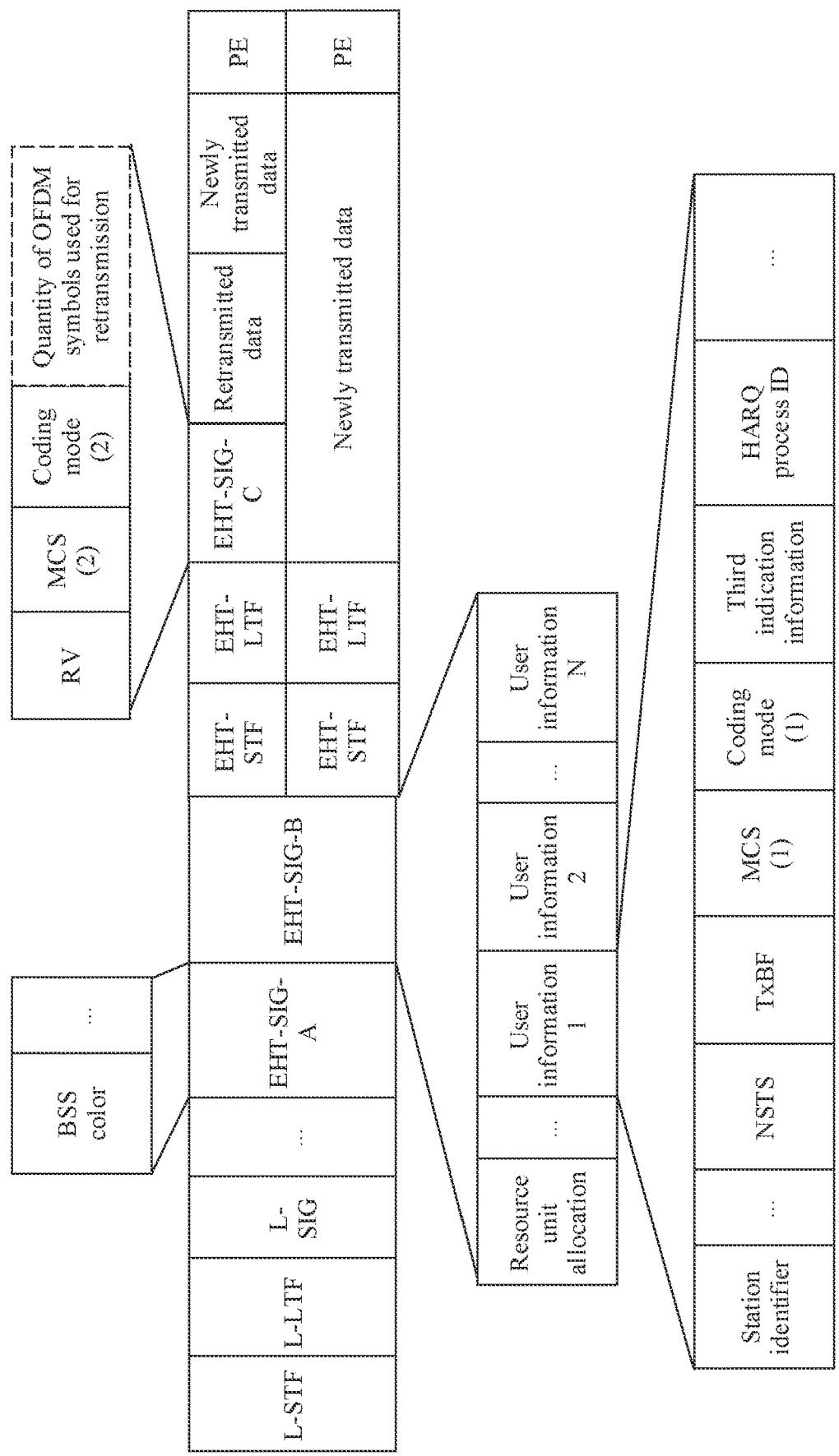
FIG. 7 is still another example of a PPDU supporting a HARQ according to this application.

FIG. 7 is still another example of a PPDU supporting a HARQ according to this application. As shown in FIG. 7, in a field B, the user information 1 includes an MCS (1) and a coding mode (1), used to indicate the MCS and the coding mode of the newly transmitted A-MPDU subframe that are sent by the transmit apparatus to the receive apparatus. In addition, the field C indicates an MCS (2) and a coding mode (2), used to indicate the MCS and the coding mode of the retransmitted A-MPDU subframe sent by the transmit apparatus to the receive apparatus.

Optionally, the field C may further include a field indicating a quantity of OFDM symbols used for retransmission, as shown by a dashed-line box in FIG. 7.

It should be understood that, in FIG. 7, an example in which user information 1 corresponds to the receive apparatus in this specification is used. Other user information (for example, user information 2 and user information N) in the field B of the PPDU respectively corresponds to different receive apparatuses. In other words, FIG. 7 shows an example in which the PPDU is used in a multi-user scenario.

Specifically, demarcation between the retransmitted A-MPDU subframe and the newly transmitted A-MPDU subframe in the data field of the PPDU is similar to that described above. A difference lies in that, a last signaling field of the PPDU shown in FIG. 7 is the field C. Therefore, the data field starts from a last symbol of the field C. In addition, a bit quantity L (RV, MCS) corresponding to the retransmitted A-MPDU subframe is a function of two variables MCS and RV.

If the PPDU shown in FIG. 7 is used, a process in which the transmit apparatus transmits data to the receive apparatus is as follows.

The transmit apparatus generates a PPDU, where the PPDU includes a signaling field and a data field. For a receive apparatus, if data sent by a transmit apparatus to the receive apparatus includes both retransmitted data and newly transmitted data, the signaling field of the PPDU indicates the first MCS and the first coding mode of the newly transmitted data, and the signaling field of the PPDU is further used to indicate the second MCS and the second coding mode of the retransmitted data.

In addition, for retransmitted A-MPDU subframes, if a maximum quantity of HARQ retransmission times is not reached, the A-MPDU subframes are sorted according to a previous transmission sequence. The earlier an A-MPDU subframe is transmitted, the earlier the A-MPDU subframe is retransmitted. A-MPDU subframes previously transmitted together during one transmission are sorted in this retransmission according to the previous transmission sequence. For A-MPDU subframes whose maximum quantity of HARQ retransmission times is reached, if the A-MPDU subframes are transmitted again, the A-MPDU subframes are transmitted in a new transmission manner.

After the PPDU is generated, the transmit apparatus transmits the PPDU to the receive apparatus. The receive apparatus receives the PPDU, and demodulates the PPDU based on the signaling field of the PPDU.

Specifically, if the third indication information of the signaling field is used to indicate that data of the receive apparatus includes the retransmitted data, the receive apparatus demodulates the retransmitted data based on the second MCS and the second coding mode that are indicated in the signaling field. Further, the receive apparatus may calculate a quantity of bits corresponding to the newly transmitted data, and demodulate the newly transmitted data based on the first MCS and the first coding mode that are indicated in the signaling field.

Manner 3

The transmit apparatus indicates, by using a reserved value of an MCS field in a signaling field of a PPDU, whether data of the receive apparatus includes retransmitted data, and indicates, by using a field C of the PPDU, a first MCS and a first coding mode that are used for newly transmitted data; and a second MCS and a second coding mode that are used for the retransmitted data.

Specifically, the signaling field includes the field B, the field B includes the MCS field, and the MCS field carries third indication information. The signaling field further includes the field C, and the field C carries the first indication information and the second indication information.

Figure 8:
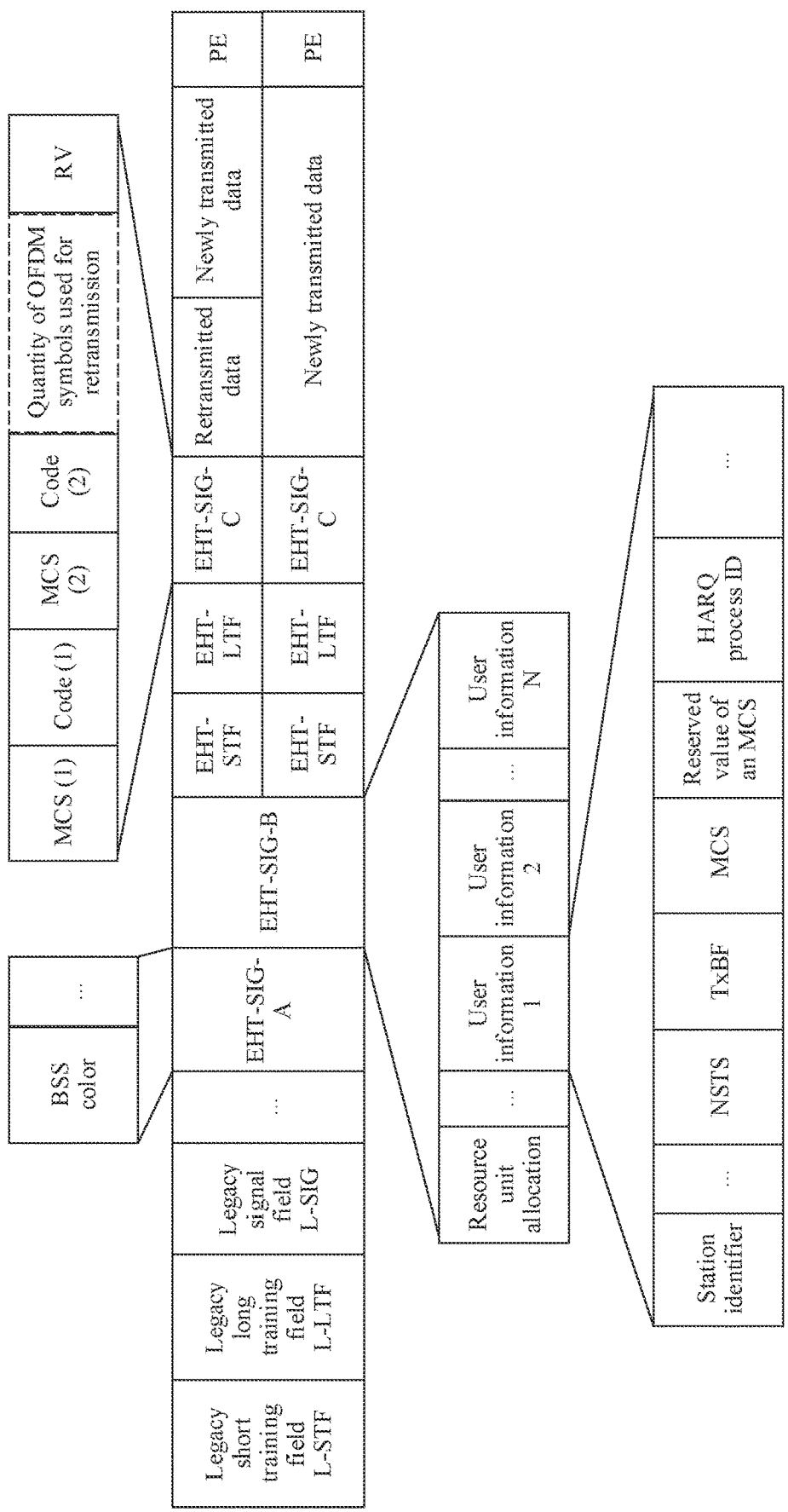
FIG. 8 is yet another example of a PPDU supporting a HARQ according to this application.

A structure of the PPDU in manner 3 may be shown in FIG. 8.

FIG. 8 is yet another example of a PPDU supporting a HARQ according to this application. As shown in FIG. 8, a reserved value (or a special value) of the MCS field in the field B indicates whether the resource unit to which the receive apparatus belongs includes the retransmitted data (that is, the MCS field carries the third indication information). Further, the field C is used to indicate the MCSs and the coding modes that are respectively used for the newly transmitted data and the retransmitted data. The MCS and the coding mode of the newly transmitted data are the MCS (1) and the coding mode (1) shown in FIG. 8, and the MCS and the coding mode of the retransmitted data are the MCS (2) and the coding mode (2) shown in FIG. 8.

In an implementation, when the reserved value of the MCS indicates any value in 0 to 14, it indicates that there is no retransmitted data in the resource unit to which the receive apparatus belongs. Table 1 shows definitions of the MCS used for newly transmitted data. In addition, when the reserved value of the MCS field indicates 15, it indicates that there is retransmitted data in the resource unit to which the receive apparatus belongs. The MCSs and the coding modes of the retransmitted data and the newly transmitted data are indicated by using the field C.

TABLE 1

| A reserved or a non-reserved value of the MCS field. | Definition |
| --- | --- |
| 0 | Binary phase shift keying BPSK, R = 1/2 |
| 1 | Quadrature phase shift keying QPSK, R = 1/2. |
| 2 | QPSK, R = 3/4 |
| 3 | 16-QAM (quadrature amplitude modulation), R = 1/2 |
| 4 | 16-QAM (quadrature amplitude modulation), R = 3/4 |
| 5 | 64-QAM = R = 2/3 |
| 6 | 64-QAM, R = 3/4 |
| 7 | 64-QAM, R = 5/6 |
| 8 | 256-QAM, R = 3/4 |

TABLE 1-continued

| A reserved or a non-reserved value of the MCS field. | Definition |
| --- | --- |
| 9 | 256-QAM, R = 5/6 |
| 10 | 1024-QAM, R = 3/4 |
| 11 | 1024-QAM, R = 5/6 |
| 12 | 4096-QAM, R = 3/4 |
| 13 | 4096-QAM, R = 5/6 |
| 14 | 4096-QAM, R = 7/8 |
| 15 | Retransmitted data is included |

Optionally, in the manner 3, only an example in which a special value of the MCS is used to indicate whether the data field includes the retransmitted data is used, and there may be another manner. For example, the receive apparatus may alternatively use a special value of a STA identifier, a special value of an LASTS, a special value of a HARQ procedure ID, or the like, to indicate whether data of the receive apparatus includes the retransmitted data. Further, the field C is used to indicate the MCSs and the coding modes that are respectively used for the newly transmitted data and the retransmitted data.

Optionally, the field C may further include a field indicating a quantity of OFDM symbols used for retransmission, as shown by a dashed-line box in FIG. 8.

However, if the data of the receive apparatus includes only the newly transmitted data, the MCS and the coding mode of the newly transmitted data may be indicated by using the field B. In this case, the resource unit to which the receive apparatus belongs may include the field C, or may not include the field C. This is not limited in this specification.

The data retransmission method provided in this application is described in detail above with reference to FIG. 1 to FIG. 8. The following describes a communication apparatus provided in this application.

Figure 9:
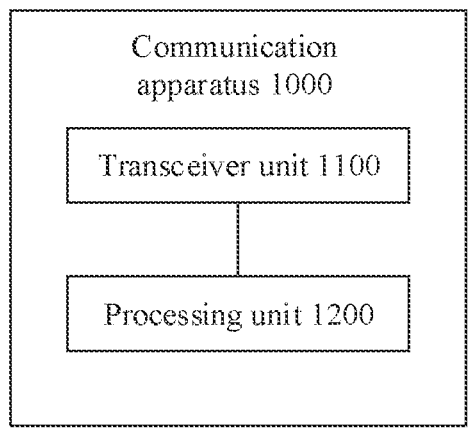
FIG. 9 is a schematic block diagram of a communication apparatus 1000 according to this application.

FIG. 9 is a schematic block diagram of a communication apparatus 1000 according to this application. As shown in FIG. 9, the communication apparatus 1000 includes a transceiver unit 1100 and a processing unit 1200.

The transceiver unit 1100 is configured to receive a physical protocol data unit PPDU from a transmit apparatus, where the PPDU includes a signaling field and a data field. The data field includes retransmitted data and newly transmitted data. The signaling field includes first indication information, or the signaling field includes the first indication information and second indication information, where the first indication information is used to indicate a first modulation and coding scheme MCS and a first coding mode that are used for the newly transmitted data, and the second indication information is used to indicate a second MCS and a second coding mode that are used for the retransmitted data.

The processing unit 1200 is configured to demodulate the PPDU based on the signaling field.

Optionally, the transceiver unit 1100 may alternatively be replaced with a transmitting unit or a receiving unit. For example, when performing a transmitting action, the transceiver unit 1100 may be replaced with the transmitting unit. When performing a receiving action, the transceiver unit 1100 may be replaced with the receiving unit.

Optionally, the signaling field further includes third indication information, and the third indication information is used to indicate whether the data field includes the retransmitted data.

Optionally, in an embodiment, the signaling field includes the first indication information, and the processing unit 1200 is specifically configured to:

demodulate the newly transmitted data included in the data field based on the first indication information by using the first MCS and the first coding mode; and demodulate the retransmitted data included in the data field by using a third MCS and a third coding mode that are used when the retransmitted data is demodulated last time.

Optionally, in an embodiment, the signaling field includes the first indication information and the second indication information, and the processing unit 1200 is specifically configured to: demodulate the newly transmitted data included in the data field based on the first indication information and the second indication information by using the first MCS and the first coding mode; and demodulate the retransmitted data included in the data field by using the second MCS and the second coding mode.

Optionally, in an embodiment, that the signaling field includes the first indication information and the second indication information includes: The signaling field includes an extremely high throughput signal field B EHT-SIG-B, and the EHT-SIG-B includes a first signaling field and a second signaling field, where the first signaling field includes the first indication information, and the second signaling field includes the second indication information.

Further optionally, that the signaling field further includes third indication information includes: The EHT-SIG-B further includes a third signaling field, and the third signaling field includes the third indication information.

Optionally, in an embodiment, that the signaling field includes the first indication information and the second indication information includes: The signaling field includes the EHT-SIG-B and an EHT-SIG-C, where the EHT-SIG-B includes the first indication information, and the EHT-SIG-C includes the second indication information.

Further optionally, that the signaling field further includes third indication information includes: The EHT-SIG-B includes the third indication information.

Optionally, in an embodiment, that the signaling field includes the first indication information and the second indication information includes: The signaling field includes the EHT-SIG-C, where the EHT-SIG-C includes the first indication information and the second indication information.

Further, the signaling field further includes the third indication information, and that the third indication information is used to indicate whether the data field includes the retransmitted data includes:

The signaling field further includes the EHT-SIG-B, where the EHT-SIG-B includes an MCS field, and a reserved value of the MCS field is used to indicate that the data field includes the retransmitted data.

Optionally, in an embodiment, the MCS field further has a plurality of non-reserved values, and each non-reserved value is used to indicate the first MCS and the first coding mode that are used for the newly transmitted data.

Optionally, in an embodiment, the data field includes M OFDM symbols in time domain, and a quantity of symbols occupied by the newly transmitted data in the data field is calculated according to the following formula: M−ceil(L/K), where L is a total quantity of bits of the retransmitted data, K is a quantity of bits that can be used to carry data on each of the M OFDM symbols, ceil ( ) indicates rounding up, and M, K, and L are all positive integers.

In an implementation, the communication apparatus 1000 may be a receive device in wireless communication. For example, the receive device is a combination device, a component, or the like that may implement a function of the receive apparatus in the foregoing method embodiments. In this implementation, the transceiver unit 1100 may be a transceiver. The transceiver may include a receiver and a transmitter. The processing unit 1200 may be a processing apparatus.

In another implementation, the communication apparatus 1000 may be a chip or an integrated circuit installed in the receive device. In this implementation, the transceiver unit 1100 may be a communication interface. For example, the transceiver unit 1100 may be an input/output interface or an input/output circuit. The input/output interface may include an input interface and an output interface. The input/output circuit may include an input circuit and an output circuit. The processing unit 1200 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 1000 performs an operation and/or processing performed by the receive apparatus in the method embodiments.

Optionally, the processing apparatus may include only the processor, and the memory configured to store the computer program is located outside the processing apparatus. The processor is connected to the memory by using a circuit/wire to read and execute the computer program stored in the memory.

Optionally, the transceiver unit 1100 may be a radio frequency apparatus, and the processing unit 1200 may be a baseband apparatus.

Figure 10:
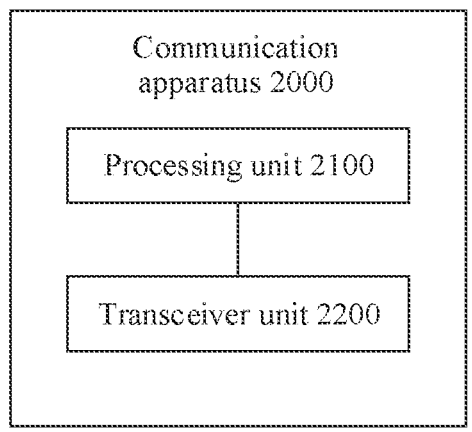
FIG. 10 is a schematic block diagram of a communication apparatus 2000 according to this application.

FIG. 10 is a schematic block diagram of a communication apparatus 2000 according to this application. As shown in FIG. 10, the communication apparatus 2000 includes a processing unit 2100 and a transceiver unit 2200.

The processing unit 2100 is configured to generate a PPDU. The PPDU includes a signaling field and a data field. The data field includes retransmitted data and newly transmitted data, the signaling field includes first indication information, or the signaling field includes the first indication information and second indication information, where the first indication information is used to indicate a first modulation and coding scheme MCS and a first coding mode that are used for the newly transmitted data, and the second indication information is used to indicate a second MCS and a second coding mode that are used for the retransmitted data.

The transceiver unit 2200 is configured to transmit the PPDU to a receive apparatus.

Optionally, the transceiver unit 2200 may alternatively be replaced with a transmitting unit or a receiving unit. For example, when performing a transmitting action, the transceiver unit 2200 may be replaced with the transmitting unit. When performing a receiving action, the transceiver unit 2200 may be replaced with the receiving unit.

Optionally, the signaling field further includes third indication information, and the third indication information is used to indicate whether the data field includes the retransmitted data.

Optionally, in an embodiment, the signaling field includes the first indication information.

Further, optionally, the third indication information is specifically used to indicate that the data field includes the retransmitted data.

Optionally, in an embodiment, the signaling field includes the first indication information and the second indication information.

Further, optionally, the third indication information is used to indicate that the data field includes the retransmitted data.

Optionally, in an embodiment, that the signaling field includes the first indication information and the second indication information includes: The signaling field includes an extremely high throughput signal field B EHT-SIG-B, and the EHT-SIG-B includes a first signaling field and a second signaling field, where the first signaling field includes the first indication information, and the second signaling field includes the second indication information.

Further, optionally, that the signaling field further includes third indication information includes:

The EHT-SIG-B further includes a third signaling field, and the third signaling field includes the third indication information.

Optionally, in an embodiment, that the signaling field includes the first indication information and the second indication information includes: The signaling field includes the extremely high throughput signal field B EHT-SIG-B and an extremely high throughput signal field C EHT-SIG-C, where the EHT-SIG-B includes the first, indication information, and the EHT-SIG-C includes the second indication information.

Further optionally, that the signaling field further includes third indication information includes: The EHT-SIG-B further includes the third indication information.

Optionally, in an embodiment, that the signaling field includes the first indication information and the second indication information includes: The signaling field includes the EHT-SIG-C, where the EHT-SIG-C includes the first indication information and the second indication information.

Further, the signaling field further includes the third indication information, and that the third indication information is used to indicate whether the data field includes the retransmitted data includes:

The signaling field further includes the EHT-SIG-B, where the EHT-SIG-B includes an MCS field, and a reserved value of the MCS field is used to indicate that the data field includes the retransmitted data.

Optionally, in an embodiment, the MCS field further has a plurality of non-reserved values, and each non-reserved value is used to indicate the first MCS and the first coding mode that are used for the newly transmitted data.

Optionally, in an embodiment, the data field includes M OFDM symbols in time domain, the retransmitted data occupies N OFDM symbols in the M OFDM symbols, and a quantity of symbols occupied by the newly transmitted data in the data field is calculated according to the following formula: M−ceil(L/K), where L is a total quantity of bits of the retransmitted data, K is a quantity of bits that can be used to carry data on each of the M OFDM symbols, ceil ( ) indicates rounding up, and M, N, and K are all positive integers.

In an implementation, the communication apparatus 2000 may be a transmit device in wireless communication. For example, the transmit device is a combination device, a component, or the like that may implement a function of the transmit apparatus in the foregoing method embodiments. In this implementation, the processing unit 2100 may be a processing apparatus, and the transceiver unit 2200 may be a transceiver. The transceiver may include a receiver and a transmitter.

In another implementation, the communication apparatus 2000 may be a chip or an integrated circuit installed in a transmit device. In this implementation, the transceiver unit 2200 may be a communication interface. For example, the transceiver unit 2200 may be an input/output interface or an input/output circuit. The input/output interface may include an input interface and an output interface. The input/output circuit may include an input circuit and an output circuit. The processing unit 2100 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 1000 performs an operation and/or processing performed by the transmit apparatus in the method embodiments.

Optionally, the processing apparatus may include only the processor, and the memory configured to store the computer program is located outside the processing apparatus. The processor is connected to the memory by using a circuit/wire to read and execute the computer program stored in the memory.

Optionally, the processing unit 2100 may be a baseband apparatus, and the transceiver unit 2200 may be a radio frequency apparatus.

Figure 11:
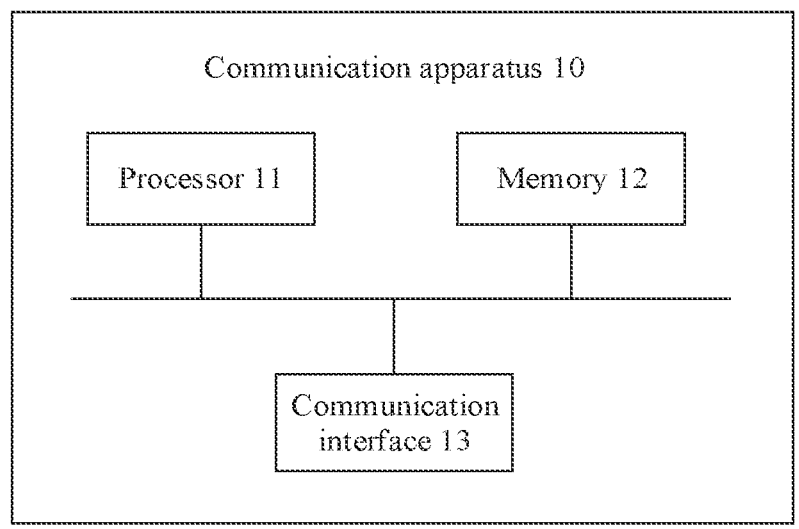
FIG. 11 is a schematic diagram depicting a structure of a communication apparatus 10 according to this application.

FIG. 11 is a schematic diagram depicting a structure of a communication apparatus 10 according to an embodiment of this application. As shown in FIG. 11, the communication apparatus 10 includes one or more processors 11, one or more memories 12, and one or more communication interfaces 13. The processor 11 is configured to control the communication interface 13 to transmit and receive a signal. The memory 12 is configured to store a computer program. The processor 11 is configured to invoke and run the computer program from the memory 12, to perform procedures and/or operations performed by the receive apparatus in the method embodiments of this application.

For example, the processor 11 may have a function of the processing unit 1200 shown in FIG. 9, and the communication interface 13 may have a function of the transceiver unit 1100 shown in FIG. 9. For details, refer to the descriptions in FIG. 9. Details are not described herein again.

Optionally, when the communication apparatus 10 is a wireless communication receive device, the processor 11 may be a baseband apparatus installed in the receive device, and the communication interface 13 may be a radio frequency apparatus.

Figure 12:
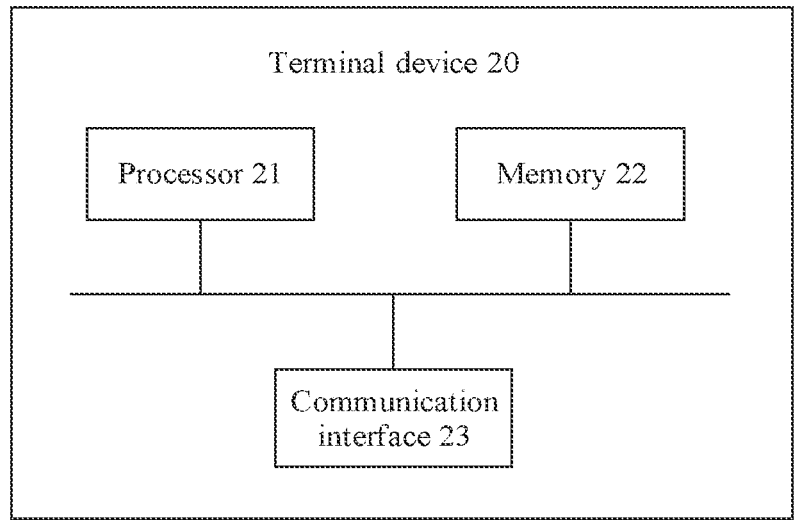
FIG. 12 is a schematic diagram depicting a structure of a communication apparatus 20 according to this application.

FIG. 12 is a schematic diagram depicting a structure of a communication apparatus 20 according to this application. As shown in FIG. 12, the communication apparatus 20 includes one or more processors 21, one or more memories 22, and one or more communication interfaces 23. The processor 21 is configured to control the communication interface 23 to transmit and receive a signal. The memory 22 is configured to store a computer program. The processor 21 is configured to invoke and run the computer program from the memory 22 perform procedures and/or operations performed by the transmit apparatus in the method embodiments of this application.

For example, the processor 21 may have a function of the processing unit 2100 shown in FIG. 10, and the communication interface 23 may have a function of the transceiver unit 2200 shown in FIG. 10. For details, refer to the descriptions in FIG. 10. Details are not described herein again.

Optionally, the memory and the processor in the foregoing apparatus embodiments may be physically independent units, or the memory may be integrated with the processor.

Figure 13:
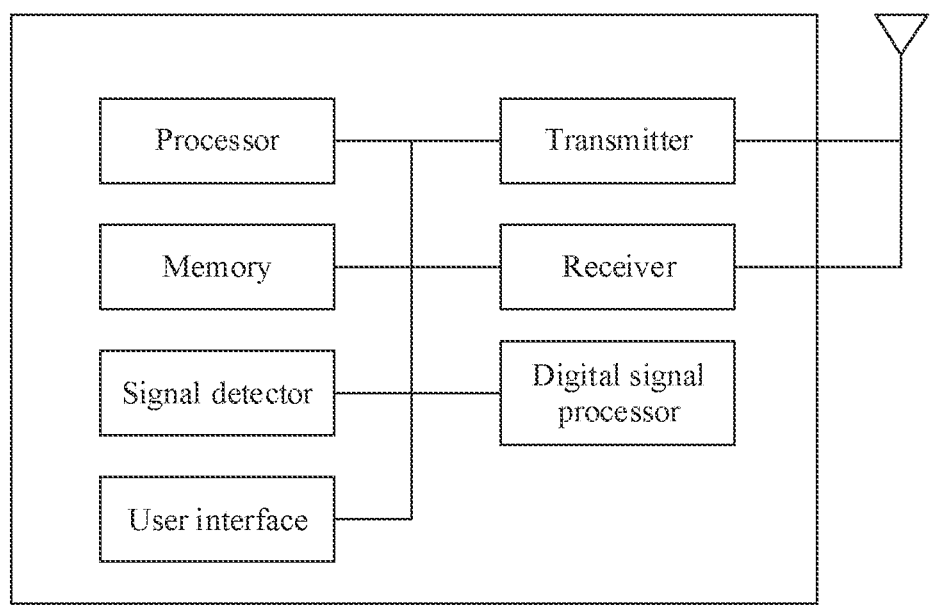
FIG. 13 is an example of a structure of a communication device according to this application.

In addition, to improve functions of the transmit apparatus or the receive apparatus in this application, a structure of the transmit apparatus or the receive apparatus in this application may be shown in FIG. 13.

FIG. 13 is an example of a structure of a communication device according to this application. As shown in FIG. 13, the communication device includes a processor, a memory, and a transceiver. In addition, the communication device may further include a signal detector, a user interface, a digital signal processor, and the like. Any one of the foregoing devices may be one or more. This is not limited in this application.

The signal detector is configured to detect signals from other communication devices. The digital signal processor has the function of processing signals. For example, when the communication device is a receive apparatus, the signal processor may demodulate a PPDU from the transmit apparatus. The memory is configured to store a computer program or instructions necessary for implementing a function of the communication device. The processor reads the computer program or the instructions from the memory, to control the communication device to implement a corresponding function.

For example, when the communication device is a transmit device, the processor has a function of the processing unit 1200 shown in FIG. 9, and the transceiver has a function of the transceiver unit 1100 shown in FIG. 9.

For example, when the communication device is a receive device, the processor has a function of the processing unit 2100 shown in FIG. 10, and the transceiver has a function of the transceiver unit 2200.

The communication apparatus provided in this application is described above.

In addition, this application further provides a computer-readable storage medium.

The computer-readable storage medium stores computer instructions. When the computer instructions are run on a computer, the computer is enabled to perform an operation and/or a procedure performed by a receive apparatus in the data retransmission method provided in this application.

This application further provides a computer-readable storage medium. The computer-readable storage medium stores computer instructions. When the computer instructions are run on a computer, the computer is enabled to perform an operation and/or a procedure performed by a transmit apparatus in the data retransmission method provided in this application.

This application further provides a computer program product. The computer program product includes computer program code. When the computer program code is run on a computer, the computer is enabled to perform an operation and/or a procedure performed by a receive apparatus in the data retransmission method provided in this application.

This application further provides a computer program product. The computer program product includes computer program code. When the computer program code is run on a computer, the computer is enabled to perform an operation and/or a procedure performed by a transmit apparatus in the data retransmission method provided in this application.

This application further provides a chip. The chip includes a processor. A memory configured to store a computer program is disposed independent of the chip. The processor is configured to execute the computer program stored in the memory, to perform an operation and/or processing performed by the receive apparatus in any method embodiment.

Further, the chip may include a communication interface. The communication interface may be an input/output interface, an input/output circuit, or the like. Further, the chip may include the memory.

This application further provides a chip. The chip includes a processor. A memory configured to store a computer program is disposed independent of the chip. The processor is configured to execute the computer program stored in the memory, to perform an operation and/or processing performed by the transmit apparatus in any method embodiment.

Further, the chip may include a communication interface. The communication interface may be an input/output interface, an input/output circuit, or the like. Further, the chip may include the memory.

In addition, this application further provides a wireless communication system, including the receive apparatus and the transmit apparatus in the embodiments of this application.

The processor in this embodiment of this application may be an integrated circuit chip, and has a signal processing capability. In an implementation process, the steps in the foregoing method embodiments may be implemented by using a hardware integrated logic circuit in the processor or instructions in a form of software. The processor may be a general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, or a discrete hardware component. The general-purpose processor may be a microprocessor, or may be any conventional processor or the like. The steps of the methods disclosed in the embodiments of this application may be directly executed and completed by using a hardware encoding processor, or may be executed and completed by using a combination of hardware and software modules in the encoding processor. A software module may be located in a storage medium mature in the art, such as a random access memory, a flash memory, a read-only memory, a programmable read-only memory, an electrically erasable programmable memory, a register, or the like. The storage medium is located in the memory, and the processor reads information in the memory and completes the steps of the foregoing methods in combination with hardware of the processor.

The memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through examples but not limitative description, RAMs in many forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

The terms such as "unit", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using the figures, both a computing device and an application that runs on the computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network such as the Internet interacting with another system by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data retransmission method, comprising:
receiving, by a first device, a physical protocol data unit (PPDU) from a second device, wherein the PPDU comprises a signaling field and a data field, the data field comprises retransmitted data and newly transmitted data, the signaling field comprises (1) first indication information or (2) the first indication information and second indication information, wherein the first indication information is used to indicate a first modulation and coding scheme (MCS) and a first coding mode that are used for the newly transmitted data, and the second indication information is used to indicate a second MCS and a second coding mode that are used for the retransmitted data, and wherein the data field comprises M OFDM symbols in time domain, and a quantity of symbols occupied by the newly transmitted data in the data field is calculated according to the following formula:
M-ceil (L/K), wherein:
L is a total quantity of bits of the retransmitted data, K is a quantity of bits that are used to carry data on each of the M OFDM symbols, ceil ( ) indicates rounding up, and M, L, and K are positive integers; and
demodulating the PPDU based on the signaling field.

2. The method according to claim 1, wherein the signaling field comprises the first indication information, and the demodulating the PPDU based on the signaling field comprises:
demodulating the newly transmitted data comprised in the data field based on the first indication information by using the first MCS and the first coding mode; and demodulating the retransmitted data comprised in the data field by using a third MCS and a third coding mode that are used when the retransmitted data is demodulated last time.

3. The method according to claim 1, wherein the signaling field comprises the first indication information and the second indication information, and the demodulating the PPDU based on the signaling field comprises:
demodulating the newly transmitted data comprised in the data field based on the first indication information and the second indication information by using the first MCS and the first coding mode; and
demodulating the retransmitted data comprised in the data field by using the second MCS and the second coding mode.

4. The method according to claim 3, wherein that the signaling field comprises the first indication information and the second indication information comprises:
the signaling field comprises an extremely high throughput signal field B (EHT-SIG-B), and the EHT-SIG-B comprises a first signaling field and a second signaling field, wherein the first signaling field comprises the first indication information, and the second signaling field comprises the second indication information.

5. The method according to claim 3, wherein that the signaling field comprises the first indication information and the second indication information comprises:
the signaling field comprises an extremely high throughput signal field B (EHT-SIG-B) and an extremely high throughput signal field C (EHT-SIG-C), wherein the EHT-SIG-B comprises the first indication information, and the EHT-SIG-C comprises the second indication information.

6. The method according to claim 3, wherein that the signaling field comprises the first indication information and the second indication information comprises:
the signaling field comprises an extremely high throughput signal field C (EHT-SIG-C), wherein the EHT-SIG-C comprises the first indication information and the second indication information; and
the signaling field further comprises an extremely high throughput signal field B (EHT-SIG-B), wherein the EHT-SIG-B comprises an MCS field, and a reserved value of the MCS field is used to indicate that the data field comprises the retransmitted data.

7. The method according to claim 6, wherein the MCS field further comprises a plurality of non-reserved values, and each non-reserved value is used to indicate the first MCS and the first coding mode that are used for the newly transmitted data.

8. A communication apparatus, comprising:
at least one processor;
a non-transitory computer readable medium storing instructions that, when executed by the at least one processor, cause the communication apparatus to perform operations comprising:
receiving a physical protocol data unit (PPDU) from a first device, wherein the PPDU comprises a signaling field and a data field, the data field comprises retransmitted data and newly transmitted data, the signaling field comprises (1) first indication information or (2) the first indication information and second indication information, wherein the first indication information indicates a first modulation and coding scheme (MCS) and a first coding mode that are used for the newly transmitted data, and the second indication information indicates a second MCS and a second coding mode that are used for the retransmitted data, and wherein the data field comprises M OFDM symbols in time domain, and a quantity of symbols occupied by the newly transmitted data in the data field is calculated according to the following formula:
M-ceil (L/K), wherein:
L is a total quantity of bits of the retransmitted data, K is a quantity of bits that are used to carry data on each of the M OFDM symbols, ceil ( ) indicates rounding up, and M, L, and K are positive integers; and
demodulating the PPDU based on the signaling field.

9. The communication apparatus according to claim 8, wherein the signaling field comprises the first indication information, and the demodulating the PPDU based on the signaling field comprises:
demodulating the newly transmitted data comprised in the data field based on the first indication information by using the first MCS and the first coding mode; and
demodulating the retransmitted data comprised in the data field by using a third MCS and a third coding mode that are used when the retransmitted data is demodulated last time.

10. The communication apparatus according to claim 8, wherein the signaling field comprises the first indication information and the second indication information, and the demodulating the PPDU based on the signaling field comprises:
demodulating the newly transmitted data comprised in the data field based on the first indication information and the second indication information by using the first MCS and the first coding mode; and
demodulating the retransmitted data comprised in the data field by using the second MCS and the second coding mode.

11. The communication apparatus according to claim 10, wherein that the signaling field comprises the first indication information and the second indication information comprises:
the signaling field comprises an extremely high throughput signal field B (EHT-SIG-B), and the EHT-SIG-B comprises a first signaling field and a second signaling field, wherein the first signaling field comprises the first indication information, and the second signaling field comprises the second indication information.

* * * * *

UNITED STATES PATENT AND TRADEMARK OFFICE
CERTIFICATE OF CORRECTION

| | | |
|---|---|---|
| PATENT NO. | : 12,237,922 B2 | Page 1 of 1 |
| APPLICATION NO. | : 17/692306 | |
| DATED | : February 25, 2025 | |
| INVENTOR(S) | : Weimin Wu, Zheng Xiao and Jian Yu | |

It is certified that error appears in the above-identified patent and that said Letters Patent is hereby corrected as shown below:

On the Title Page

In Column 2 item (56) (Other Publications), In Line 1, Delete "802.Nov. 2016" and insert -- 802.11-2016 --.

In Column 2 item (56) (Other Publications), In Line 1, Delete "802.Nov. 2012)," and insert -- 802.11-2012), --.

Signed and Sealed this
Twenty-second Day of July, 2025

Coke Morgan Stewart
*Acting Director of the United States Patent and Trademark Office*